United States Patent
Thompson

(10) Patent No.: US 12,372,725 B1
(45) Date of Patent: *Jul. 29, 2025

(54) WAVEGUIDE COUPLERS FOR MULTI-MODE WAVEGUIDES

(71) Applicant: PSIQUANTUM CORP., Palo Alto, CA (US)

(72) Inventor: Mark Thompson, Palo Alto, CA (US)

(73) Assignee: PsiQuantum Corp., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/228,619

(22) Filed: Jul. 31, 2023

Related U.S. Application Data

(60) Continuation of application No. 17/694,475, filed on Mar. 14, 2022, now Pat. No. 11,714,329, which is a
(Continued)

(51) Int. Cl.
*G02B 6/28* (2006.01)
*G02B 6/12* (2006.01)
(Continued)

(52) U.S. Cl.
CPC ....... *G02B 6/2821* (2013.01); *G02B 6/12002* (2013.01); *G02B 6/1228* (2013.01);
(Continued)

(58) Field of Classification Search
CPC ...... G02B 6/126; G02B 6/1228; G02B 6/125; G02B 6/2821; G02B 2006/12147;
(Continued)

(56) References Cited

U.S. PATENT DOCUMENTS

| 5,159,699 A | 10/1992 | de Monts |
| 6,122,416 A | 9/2000 | Ooba et al. |

(Continued)

FOREIGN PATENT DOCUMENTS

| EP | 0532014 B1 | 1/1998 |
| JP | H04264429 A | 9/1992 |

(Continued)

OTHER PUBLICATIONS

Li, Ultralow-Loss, High Density SOI Optical Waveguide Routing for Macrochip Interconnects, May 11, 2012, 5 pgs.
(Continued)

*Primary Examiner* — Michelle R Connelly
(74) *Attorney, Agent, or Firm* — Morgan, Lewis & Bockius LLP

(57) ABSTRACT

An optical coupler includes a first waveguide including a first multi-mode waveguide section having a cross-section characterized by a first height and a first width that is greater than the first height and a second waveguide including a second multi-mode waveguide section having a cross-section characterized by a second height and a second width that is greater than the second height. The first multi-mode waveguide section is positioned adjacent to the second multi-mode waveguide section at least partially above or below the second multi-mode waveguide so that light entering the first multi-mode waveguide section is coupled from the first multi-mode waveguide section to the second multi-mode waveguide section. Methods for coupling light between waveguides with the optical coupler and optical devices that include the optical coupler are also described.

18 Claims, 10 Drawing Sheets

Related U.S. Application Data division of application No. 16/693,163, filed on Nov. 22, 2019, now Pat. No. 11,275,210.

(60) Provisional application No. 62/802,522, filed on Feb. 7, 2019, provisional application No. 62/776,936, filed on Dec. 7, 2018.

(51) Int. Cl.
| | |
|---|---|
| *G02B 6/122* | (2006.01) |
| *G02B 6/125* | (2006.01) |
| *G02F 1/21* | (2006.01) |
| *G02F 1/225* | (2006.01) |
| *G02F 1/313* | (2006.01) |

(52) U.S. Cl.
CPC ............. *G02B 6/125* (2013.01); *G02F 1/212* (2021.01); *G02F 1/225* (2013.01); *G02F 1/3132* (2013.01); *G02F 1/3133* (2013.01); *G02F 1/3135* (2021.01); *G02B 2006/1209* (2013.01)

(58) Field of Classification Search
CPC ...... G02B 6/12002; G02B 6/122; G02B 6/14; G02B 6/12004; G02B 2006/121; G02B 2006/12097; G02B 6/2733; G02B 6/305; G02B 6/24
See application file for complete search history.

(56) References Cited

U.S. PATENT DOCUMENTS

| | | | |
|---|---|---|---|
| 6,385,376 B1 | 5/2002 | Bowers et al. | |
| 6,563,966 B1 | 5/2003 | Tang | |
| 6,724,968 B2 | 4/2004 | Lackritz et al. | |
| 7,095,920 B1 | 8/2006 | Little | |
| 7,289,698 B2 | 10/2007 | Deliwala | |
| 8,189,972 B2 | 5/2012 | Little | |
| 11,275,210 B1* | 3/2022 | Thompson | G02F 1/3132 |
| 11,506,919 B2 | 11/2022 | Cherchi et al. | |
| 11,714,329 B1 | 8/2023 | Thompson | |
| 11,789,205 B1 | 10/2023 | Thompson | |
| 2003/0202770 A1 | 10/2003 | Garito et al. | |
| 2008/0044126 A1 | 2/2008 | Costa et al. | |
| 2012/0219026 A1 | 8/2012 | Saracco et al. | |
| 2012/0321245 A1 | 12/2012 | Vahala et al. | |
| 2012/0330625 A1 | 12/2012 | Bagheri et al. | |
| 2015/0188659 A1 | 7/2015 | Lipson et al. | |
| 2015/0260916 A1 | 9/2015 | Cherchi et al. | |

FOREIGN PATENT DOCUMENTS

| | | |
|---|---|---|
| JP | 05307124 A | 11/1993 |
| JP | 05333221 A | 12/1993 |
| JP | 2000321454 A | 11/2000 |
| JP | 3654383 B2 | 6/2005 |
| JP | 4114791 B2 | 7/2008 |
| JP | 2011154331 A | 8/2011 |
| JP | 4237105 B2 | 3/2019 |
| WO | WO2019005826 A1 | 1/2019 |
| WO | WO2019038477 A1 | 2/2019 |

OTHER PUBLICATIONS

Bamiedakis, Cost Effective Polymer Multimode Directional Couplers for High-Speed on Board Optical Interconnects, Jun. 11-13, 2008, 4 pgs.
Lagali, University of Alberta, The Generalized Mach-Zehnder Interferometer Using Multimode Interference Couplers for Optical Communications Networks, 2000, 155 pgs.
Gundavarapu, Integrated Sagnac Optical Gyroscope Sensor Using Ultra-Low Loss High Aspect Ratio Silicon Nitride Waveguide Coil, 2017, 4 pgs.
Lee, Ultra-Low-Loss Optical Delay Line on a Silicon Chip, May 29, 2012, 7 pgs.
Tran, Ultra-Low-Loss Silicon Waveguides for Heteroeneously Integrated Silicon/III-V Photonics, Jul. 13, 2018, 13 pgs.
Sacher, Monolithically Integrated Multilayer Silicon Nitride-on-Silicon Waveguide Platforms for 3-D Photonic Circuits and Devices, Proceedings of the IEEE, vol. 106, No. 12, Dec. 2018, 14 pgs.
Mohanty, Nature Communications, Quantum Interference Between Transcerse Spatial Waveguide Modes, Jan. 20, 2017, 7 pgs.
Yang, Silicon Nitride Three-Mode Division Multiplexing and Wavelength-Division Multiplexing Using Asymetrical Directional Couplers and Microring Resonators, Sep. 8, 2014, 12 pgs.
Fu, Efficient Adiabatic Silicon-on Insulator Waveguide Taper, vol. 2, No. 3, Jun. 2014, 4 pgs.
Thompson, Non-Final Office Action, U.S. Appl. No. 16/741,646, Jan. 27, 2021, 17 pgs.
Thompson, Final Office Action, U.S. Appl. No. 16/741,646, Oct. 22, 2021, 20 pgs.
Thompson, Notice of Allowance, U.S. Appl. No. 16/741,646, Dec. 15, 2022, 11 pgs.
Thompson, Non-Final Office Action, U.S. Appl. No. 16/741,646, May 27, 2022, 33 pgs.
Chang et al., "Resonance-Free Light Recycling in Waveguides", Conference of Laser and Electro-Optics (CLEO) 2017, paper SF1J.5, (Year:2017), 2 pgs.
Luo et al., "WDM-Compatible Mode Division Multiplexing on a Silicon Chip", Nature Communications, 5:3069, pp. 1-7, (Year:2014), 7 pgs.
Wang et al., "On-Chip Silicon 8-Channel Hybrid (de)Multiplexer Enabling Simultaneous Mode-and Polarization-Division-Multiplexing", Laser Photonics Rev. 8, No. 2, L18-L-22, (Year:2014), 5 pgs.
Bonneau, Non-Final Office Action, U.S. Appl. No. 16/875,372, Aug. 23, 2021, 11 pgs.
Bonneau, Notice of Allowance, U.S. Appl. No. 16/875,372, Mar. 22, 2022, 9 pgs.
Thompson, Non-Final Office Action, U.S. Appl. No. 16/693,163, Feb. 18, 2021, 18 pgs.
Thompson, Notice of Allowance, U.S. Appl. No. 16/693,163, Nov. 3, 2021, 12 pgs.
Teknologian Tutkimuskeskus VTT OY, PCT/FI2018/050595, International Search Report and Written Opinion, Nov. 28, 2018, 15 pgs.
Teknologian Tutkimuskeskus VTT OY, PCT/F12018/050595, International Preliminary Report on Patentability, Feb. 25, 2020, 10 pgs.
Ye, "Stress engineering for Polarization Control in Silicon-On-Insulator Waveguides and its Applications in Novel Passive Polarization Splitters/Filters", Carleton University, Dec. 2006, ISB: 978-0-494-23305-4, 227 pgs.
Jalas, Faray Rotation in Silicon Waveguides, 2017, International Conference on Group IV Photonics, pp. 141-142.
Hutchings et al., Quasi-Phase-Matched Farday Rotation in Semiconductor Waveguides with a Magnetooptic Cladding for Monolithically Integrated Optical Isolators, In IEEE Photonics Journal, Dec. 2013, vol. 5, No. 6, 6602512, 13 pgs.
Ghosh, Optical Isolator for TE Polarized Light Realized by Adhesive Bonding of Ce: YIG on Silicon-On-Insulator Wveguide Circuits, In IEEE Photonics Journal Jun. 2013, vol. 5, No. 3, 6601108, 9 pgs.
Thompson, Non-Final Office Action, U.S. Appl. No. 17/694,475, Sep. 27, 2022, 27 pgs.
Aalto et al., "Total internal reflection mirrors with ultra-low losses in 3 μm thick SOI waveguides", Proc. SPIE 9367, Silicon Photonics X, 93670B (Feb. 27, 2015); 10 pgs. https://doi.org/10.1117/12.2079748.
Cherchi et al., "Low-loss spiral waveguides with ultra-small footprint on a micron scale SOI platform", Proceedings vol. 8990, Silicon Photonics IX; 899005 (2014), 8 pgs. https://doi.org/10.1117/12.2039940 Event: SPIE OPTO, 2014, San Francisco, California, United States.

(56) References Cited

OTHER PUBLICATIONS

Thompson, Notice of Allowance, U.S. Appl. No. 17/843,802, Apr. 4, 2023, 9 pgs.
Thompson, Notice of Allowance, U.S. Appl. No. 17/694,475, Mar. 16, 2023, 9 pgs.
Thompson, Non-Final Office Action, U.S. Appl. No. 18/138,676, Feb. 14, 2024, 13 pgs.

* cited by examiner

WAVEGUIDE COUPLERS FOR MULTI-MODE WAVEGUIDES

RELATED APPLICATIONS

This application is a continuation of U.S. patent application Ser. No. 17/694,475, filed Mar. 14, 2022, now U.S. Pat. No. 11,714,329, which is a divisional application U.S. patent application Ser. No. 16/693,163, filed Nov. 22, 2019, now U.S. Pat. No. 11,275,210, which claims priority to U.S. Provisional Application No. 62/802,522, filed Feb. 7, 2019 and U.S. Provisional Application No. 62/776,936, filed Dec. 7, 2018, each of which is incorporated herein by reference in its entirety.

TECHNICAL FIELD

This relates generally to waveguides, and more specifically to waveguide couplers.

BACKGROUND

Optical waveguides are widely used for transmitting light. For example, optical fibers are used in various telecommunication systems. Slab or planar waveguides are used in photonic devices for manipulating light (such as directing light, coupling light, filtering light, generating light output, etc.).

Although optical waveguides are generally known to have low loss in transmitting light, the loss can be significant in certain applications, such as long-haul communication. Some applications, such as single-photon optics, cannot tolerate the loss in conventional optical waveguides, as devices with conventional optical waveguides would not operate for such applications.

SUMMARY

In accordance with some embodiments, an optical coupler includes a first waveguide. The first waveguide includes a first multi-mode waveguide section. The first multi-mode waveguide section has a cross-section characterized by a first height and a first width that is greater than the first height. The optical coupler also includes a second waveguide that is distinct and separate from the first waveguide. The second waveguide includes a second multi-mode waveguide section that is distinct and separate from the first multi-mode waveguide section. The second multi-mode waveguide section has a cross-section characterized by a second height and a second width that is greater than the second height. The first multi-mode waveguide section is positioned adjacent to the second multi-mode waveguide section at least partially above or below the second multi-mode waveguide so that light entering the first multi-mode waveguide section is coupled from the first multi-mode waveguide section to the second multi-mode waveguide section.

In some embodiments, the first multi-mode waveguide section and the second multi-mode waveguide section are configured to allow light entering the first multi-mode waveguide section in a fundamental mode is coupled from the first multi-mode waveguide section to the second multi-mode waveguide section while remaining in the fundamental mode.

In some embodiments, the first width is at least three times the first height; and the second width is at least three times the second height.

In some embodiments, a center-to-center distance between the first multi-mode waveguide section and the second multi-mode waveguide section is less than an average of the first width and the second width.

In some embodiments, the first waveguide includes a third multi-mode waveguide section that is distinct from, and mutually exclusive to, the first multi-mode waveguide section so that light propagating in the third multi-mode waveguide section propagates toward the first multi-mode waveguide section. The second waveguide includes a fourth multi-mode waveguide section that is distinct from, and mutually exclusive to, the second multi-mode waveguide section so that light propagating in the fourth multi-mode waveguide section propagates toward the second multi-mode waveguide section.

In some embodiments, the first waveguide includes a fifth multi-mode waveguide section that is coupled to the first multi-mode waveguide section on a first end and to the third multi-mode waveguide section on a second end that is opposite to the first end. The second waveguide includes a sixth multi-mode waveguide section that is coupled to the second multi-mode waveguide section on a first end and to the fourth multi-mode waveguide section on a second end that is opposite to the first end. At least one of the fifth multi-mode waveguide section and the sixth multi-mode waveguide section is curved.

In some embodiments, the first waveguide includes a seventh multi-mode waveguide section that is distinct from, and mutually exclusive to, the first multi-mode waveguide section so that light propagating in the first multi-mode waveguide section propagates toward the seventh multi-mode waveguide section. The second waveguide includes an eighth multi-mode waveguide section that is distinct from, and mutually exclusive to, the second multi-mode waveguide section so that light propagating in the second multi-mode waveguide section propagates toward the eighth multi-mode waveguide section.

In some embodiments, the first waveguide includes a ninth multi-mode waveguide section that is coupled to the first multi-mode waveguide section on a first end and to the seventh multi-mode waveguide section on a second end that is opposite to the first end. The second waveguide includes a tenth multi-mode waveguide section that is coupled to the second multi-mode waveguide section on a first end and to the eighth multi-mode waveguide section on a second end that is opposite to the first end. At least one of the ninth multi-mode waveguide section and the tenth multi-mode waveguide section is curved.

In some embodiments, the first waveguide includes a first single-mode input waveguide section adiabatically coupled to the first multi-mode waveguide section so that the first multi-mode waveguide section receives light from the first single-mode input waveguide section. The second waveguide includes a second single-mode input waveguide section adiabatically coupled to the second multi-mode waveguide section so that the second multi-mode waveguide section receives light from the second single-mode input waveguide section.

In some embodiments, the optical coupler further includes a first tapered waveguide section, in the first waveguide, configured to enable the adiabatic coupling of the first single-mode input waveguide section to the first multi-mode waveguide section; and a second tapered waveguide section, in the second waveguide, configured to enable the adiabatic coupling of the second single-mode input waveguide section to the second multi-mode waveguide section.

In some embodiments, the optical coupler includes, in the first waveguide: a first single-mode output waveguide section adiabatically coupled to the first multi-mode waveguide section so that the first single-mode output waveguide section receives light from the first multi-mode waveguide section; and a third tapered waveguide section configured to enable the adiabatic coupling of the first multi-mode waveguide section to the first single-mode output waveguide section. The optical coupler also includes, in the second waveguide: a second single-mode output waveguide section adiabatically coupled to the second multi-mode waveguide section so that the second single-mode output waveguide section receives light from the second multi-mode waveguide section; and a fourth tapered waveguide section configured to enable the adiabatic coupling of the second multi-mode waveguide section to the second single-mode output waveguide section.

In some embodiments, the first multi-mode waveguide section and the second multi-mode waveguide section are parallel to each other; and the first multi-mode waveguide section and the second multi-mode waveguide section are separated by a first edge-to-edge distance in an range of 20-500 nm, e.g., between 50-300 nm.

In some embodiments, the first waveguide and the second waveguide are located over a substrate.

In some embodiments, the first waveguide and the second waveguide have sidewalls that are substantially perpendicular with respect to a surface of the substrate.

In some embodiments, the first multi-mode waveguide section is formed in a first layer of material located over the substrate; and the second multi-mode waveguide section is formed in a second layer of material located over the substrate that is distinct and separate from the first layer of material.

In accordance with some embodiments, a method includes injecting first light into a first waveguide having a first multi-mode waveguide section, the first multi-mode waveguide section having a cross-section characterized by a first height and a first width that is greater than the first height. The method also includes transferring at least a portion of the first light from the first multi-mode waveguide section to a second multi-mode waveguide section of a second waveguide that is distinct and separate from the first waveguide and positioned at least partially above or below the first multi-mode waveguide section of the first waveguide, the second multi-mode waveguide section having a cross-section characterized by a second height and a second width that is greater than the second height. The method further includes propagating the transferred portion of the first light.

In some embodiments, the first light propagates in the first waveguide in a fundamental mode; and the transferred portion of the first light propagates in the second waveguide in the fundamental mode.

In some embodiments, the first waveguide includes a single-mode input waveguide section adiabatically coupled with the first multi-mode waveguide section; and the method includes injecting the first light into the single-mode input waveguide section so that the first light propagates in the single-mode input waveguide section in the fundamental mode and the first light is coupled to the first multi-mode waveguide section while remaining in the fundamental mode.

In some embodiments, the method further includes injecting second light into the second waveguide; transferring at least a portion of the second light from the second multi-mode waveguide section to the first multi-mode waveguide section of the first waveguide; and propagating the transferred portion of the second light through the first waveguide.

In accordance with some embodiments, an optical device includes a first plurality of optical waveguides formed in a first layer of material; and a second plurality of optical waveguides formed in a second layer of material that is distinct and separate from the first layer of material. At least one optical waveguide of the first plurality of optical waveguides is coupled with an optical waveguide of the second plurality of optical waveguides with any optical coupler described herein.

In accordance with some embodiments, a generalized Mach-Zehnder interferometer includes a first multi-channel optical coupler with a plurality of output waveguides and a second multi-channel optical coupler with a plurality of input waveguides. At least one of the first multi-channel optical coupler and the second multi-channel optical coupler corresponds to one or a connected network of more than one of any multi-mode optical coupler described herein. The generalized Mach-Zehnder interferometer also includes a plurality of optical waveguides, each optical waveguide coupled with a respective output waveguide of the first multi-channel optical coupler and a respective input waveguide of the second multi-channel optical coupler; and one or more phase shifters coupled with at least a subset of the plurality of optical waveguides.

In accordance with some embodiments, a multi-channel multi-mode optical coupler includes two or more multi-mode optical couplers. The two or more multi-mode optical couplers includes a first multi-mode optical coupler. The first multi-mode optical coupler includes a first waveguide including a first multi-mode waveguide section and a second waveguide that is distinct and separate from the first waveguide. The second waveguide includes a second multi-mode waveguide section. The first waveguide is located in a first layer of material, and the second waveguide is located in a second layer of material that is distinct and separate from the first layer of material. The first multi-mode waveguide section is positioned adjacent to the second multi-mode waveguide section.

In some embodiments, the two or more multi-mode optical couplers also include a second multi-mode optical coupler. The second multi-mode optical coupler includes a third waveguide including a third multi-mode waveguide section and a fourth waveguide that is distinct and separate from the third waveguide. The fourth waveguide including a fourth multi-mode waveguide section. The fourth waveguide is located in the second layer of material, and the third waveguide being located in the first layer of material. The third multi-mode waveguide section is positioned adjacent to the fourth multi-mode waveguide section. A portion of the second waveguide is positioned adjacent to a portion of the third waveguide for coupling light from the second waveguide to the third waveguide.

In some embodiments, the two or more multi-mode optical couplers also include a third multi-mode optical coupler and a fourth multi-mode optical coupler. The third multi-mode optical coupler includes a fifth waveguide including a fifth multi-mode waveguide section and the fourth waveguide that is distinct and separate from the fifth waveguide. The fifth waveguide being located in the first layer of material. The fourth waveguide includes a sixth multi-mode waveguide section that is different from the fourth multi-mode waveguide section. The fifth multi-mode waveguide section is positioned adjacent to the sixth multi-mode waveguide section. The fourth multi-mode optical coupler includes the first waveguide including a seventh multi-mode waveguide section that is different from the first multi-mode waveguide section and a sixth waveguide including an eighth multi-mode waveguide section. The sixth waveguide is located in the second layer of material. The seventh multi-mode waveguide section is positioned adjacent to the eighth multi-mode waveguide section. A portion of the fifth waveguide is positioned adjacent to a portion of the sixth waveguide for coupling light from the fifth waveguide to the sixth waveguide.

In accordance with some embodiments, a generalized Mach-Zehnder interferometer includes: a first multi-channel optical coupler that includes four or more output ports; a second multi-channel optical coupler that includes four or more input ports; and four or more optical waveguides. A respective optical waveguide of the four or more optical waveguides is connected to a respective output port of the four or more output ports and a respective input port of the four or more input ports. The generalized Mach-Zehnder interferometer also includes one or more phase shifters coupled with at least a subset of the four or more optical waveguides. At least one of the first multi-channel optical coupler and the second multi-channel optical coupler includes a first waveguide including a first multi-mode waveguide section and a second waveguide that is distinct and separate from the first waveguide. The second waveguide includes a second multi-mode waveguide section. The first multi-mode waveguide section is positioned adjacent to the second multi-mode waveguide section.

In some embodiments, the first waveguide is located in a first layer of material; and the second waveguide being located in a second layer of material that is distinct and separate from the first layer of material.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
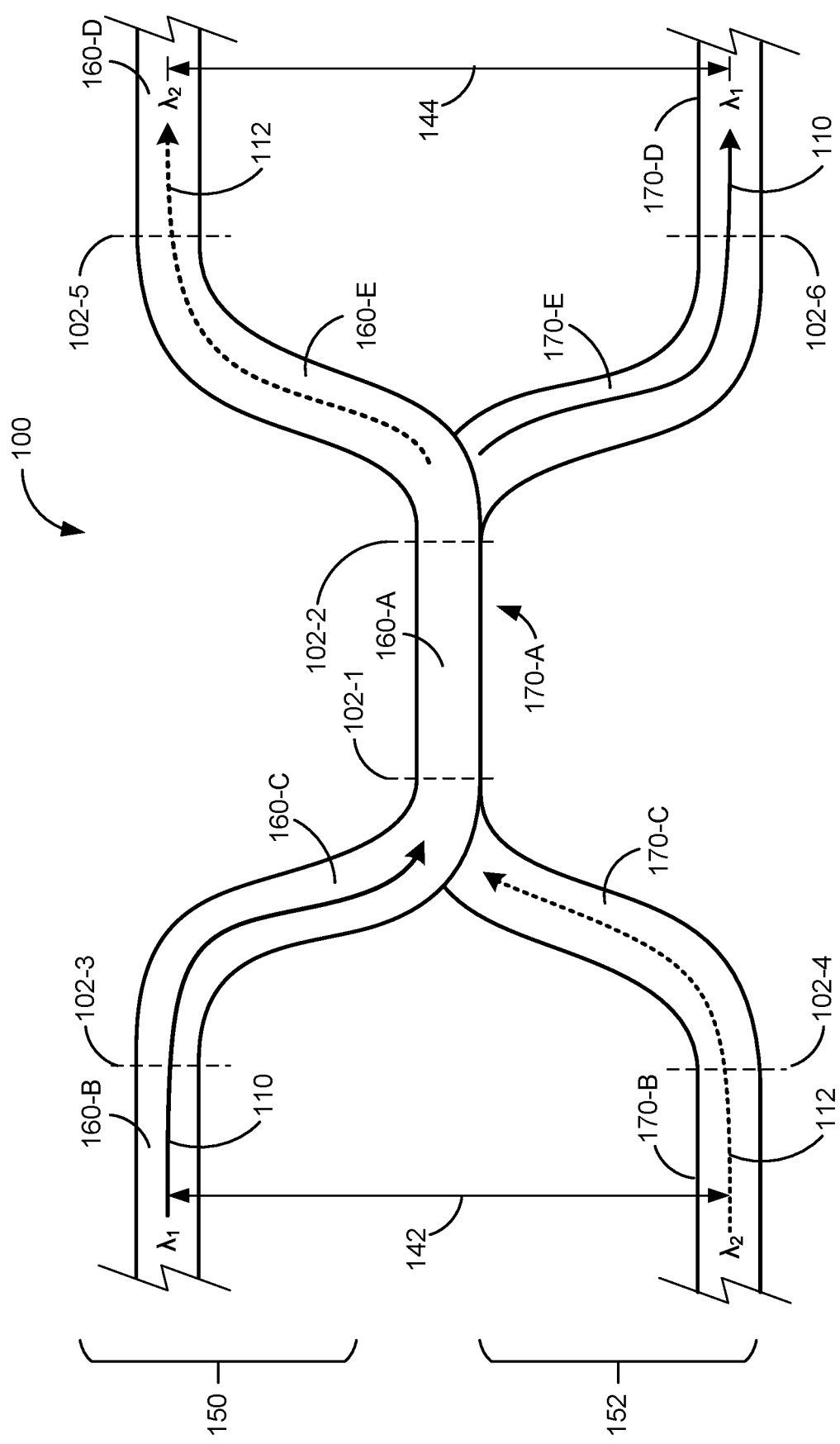
FIGS. 1A and 1B are partial plan views of an optical coupler in accordance with some embodiments.

These figures are not drawn to scale unless indicated otherwise.

DETAILED DESCRIPTION

As explained above, there is a need for optical waveguides with reduced loss. The above deficiencies and other problems associated with conventional optical waveguides are reduced or eliminated by the disclosed optical waveguides. In slab or planar waveguides, some of the losses occur when transmitted light comes into contact with walls that have irregular surfaces. Planar waveguides fabricated with the currently available semiconductor fabrication techniques typically have top and bottom surfaces that are smoother than side walls (e.g., the surface roughness of the top and bottom surfaces is lower than the surface roughness of the side walls). The optical loss can decrease by reducing interaction between light propagating within the optical waveguide and the side walls. The disclosed embodiments include optical waveguides that are wide and short so that the distance between the side walls is greater than the distance between the top and bottom surfaces. This configuration reduces the interaction between the transmitted light and the side walls. In particular, when a fundamental mode is transmitted through the wide and short optical waveguide, the fundamental mode has a width that extends less toward the side walls of the optical waveguide, compared to a fundamental mode transmitted through a single mode waveguide. This, in turn, reduces the loss of the transmitted light.

However, an optical coupler for such waveguides can have a lower coupling efficiency for a given coupling length due to the increased distance between two waveguides when the two waveguides are placed side-by-side. Instead of increasing the coupling length to increase the overall coupling efficiency of the optical coupler, which increases the size of the optical coupler and also increases the attenuation within the optical coupler due to the increased coupling length, some of the disclosed embodiments include waveguides that are located at least partially above or below each other so that the distance between the two waveguides is reduced, which, in turn, allows a high coupling efficiency for the given coupling length.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first waveguide could be termed a second waveguide, and, similarly, a second waveguide could be termed a first waveguide, without departing from the scope of the various described embodiments. The first waveguide and the second waveguide are both waveguides, but they are not the same waveguide.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1B:
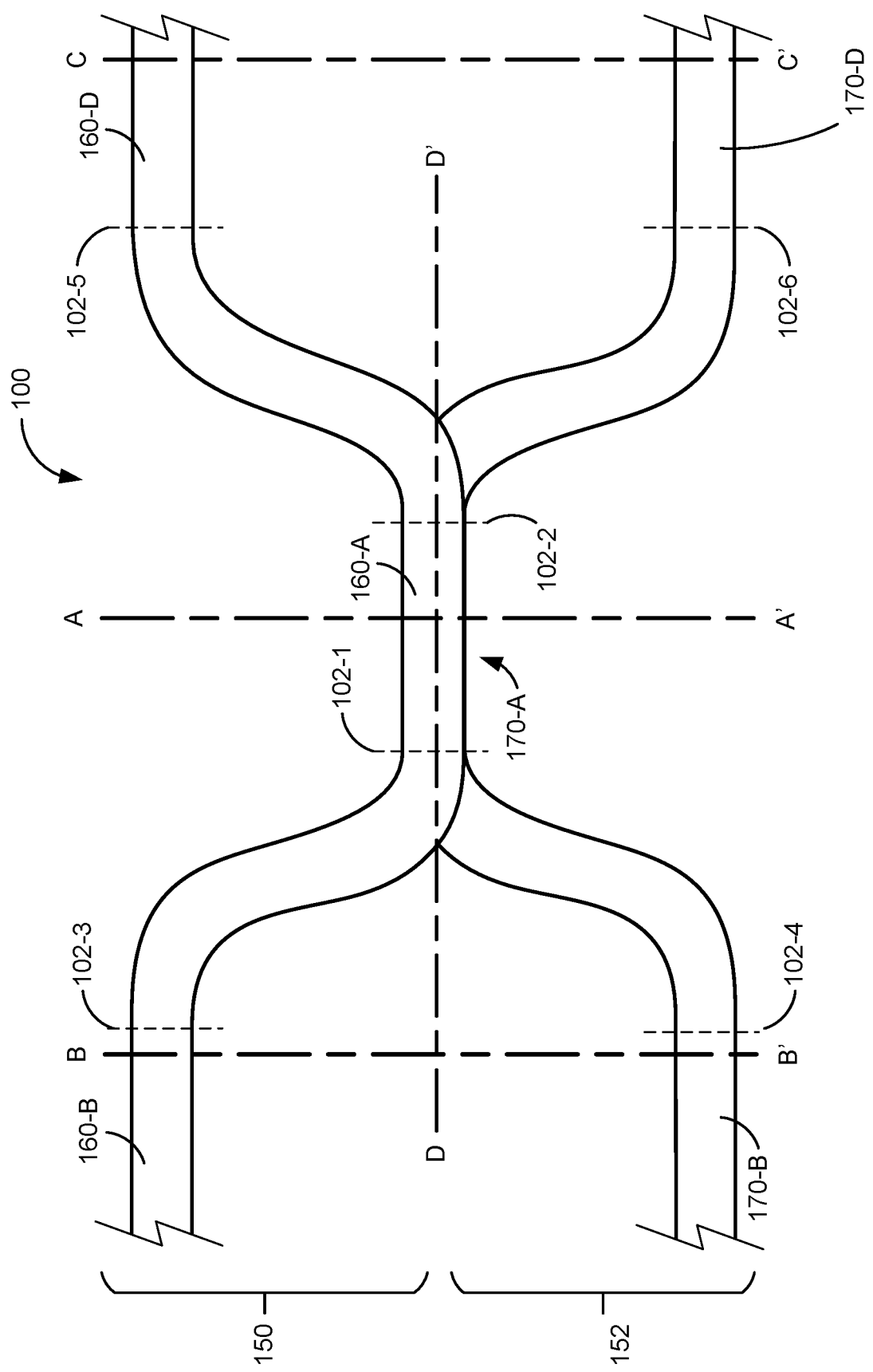

FIGS. 1A and 1B are partial plan views of an optical coupler 100 for coupling light between waveguides in accordance with some embodiments.

The optical coupler 100 includes a first waveguide 150 and a second waveguide 152 that is distinct and separate from the first waveguide 150. The first waveguide 150 includes a first multi-mode waveguide section 160-A between lines 102-1 and 102-2 (representing the coupling region). The second waveguide 152 includes, between lines 102-1 and 102-2, a second multi-mode waveguide section 170-A that is distinct and separate from the first multi-mode waveguide section 160-A. In some embodiments, the length of the first and/or second multi-mode waveguide sections 160-A and 170-A (i.e., the distance between lines 102-1 and 102-2) is between 5-200 μm but other lengths are possible without departing from the scope of the present disclosure.

A coupling efficiency between the first waveguide 150 and the second waveguide 152 is determined based on the length of the first and second multi-mode waveguide sections 160-A and 170-A, in addition to the refractive index of the first waveguide 150, the refractive index of the second waveguide 152, the width and height of the first waveguide 150, the width and height of the second waveguide 152, the refractive index of the material located between the first waveguide 150 and the second waveguide 152, and the distance between the first waveguide 150 and the second waveguide 152. In some embodiments, at least one of the length of the first multi-mode waveguide section 160-A and the length of the second multi-mode waveguide section 170-A corresponds to 100% coupling efficiency between the first waveguide 150 and the second waveguide 152 (for a given set of parameters for the refractive index of the first waveguide 150, the refractive index of the second waveguide 152, the width and height of the first waveguide 150, the width and height of the second waveguide 152, the refractive index of the material located between the first waveguide 150 and the second waveguide 152, and the distance between the first waveguide 150 and the second waveguide 152). In some embodiments, at least one of the length of the first multi-mode waveguide section 160-A and the length of the second multi-mode waveguide section 170-A corresponds to a coupling efficiency between the first waveguide 150 and the second waveguide 152 that is less than 100% (e.g., between 1% and 99%, between 10% and 90%, between 20% and 80%, between 30% and 70%, between 40% and 60%, between 45% and 55%, and between 49% and 51%, etc.). For example, the optical coupler 100 having 50% coupling efficiency may operate as a 50/50 beam splitter.

In some embodiments, the first multi-mode waveguide section 160-A is a straight waveguide section. In some embodiments, the second multi-mode waveguide section 170-A is a straight waveguide section.

In some embodiments, the first multi-mode waveguide section 160-A and the second multi-mode waveguide section 170-A are parallel to each other.

In some embodiments, the first waveguide 150 and the second waveguide 152 are made of the same material (e.g., silicon, silicon nitride, silicon oxynitride, indium phosphide, gallium arsenide, aluminum gallium arsenide, lithium niobite, or any other suitable photonic material including silicon and/or germanium based materials). In some embodiments, the first waveguide 150 and the second waveguide 152 are made of different materials (e.g., the first waveguide 150 is made of silicon and the second waveguide 152 is made of silicon nitride).

Also shown in FIG. 1A are a third multi-mode waveguide section 160-B and a fourth multi-mode waveguide section 170-B. The third multi-mode waveguide section 160-B is coupled to the first multi-mode waveguide section 160-A via a fifth multi-mode waveguide section 160-C located between lines 102-3 and 102-1, and the fourth multi-mode waveguide section 170-B is coupled to the second multi-mode waveguide section 170-A via a sixth multi-mode waveguide section 170-C between lines 102-4 and 102-1. In some embodiments, the fifth multi-mode waveguide section 160-C is curved as shown in FIG. 1A. In some embodiments, the fifth multi-mode waveguide section 160-C is straight. In some embodiments, the sixth multi-mode waveguide section 170-C is curved as shown in FIG. 1A. In some embodiments, the sixth multi-mode waveguide section 170-C is straight. In some embodiments, at least one of the fifth multi-mode waveguide section 160-C and the sixth multi-mode waveguide section 170-C has a portion that is curved.

FIG. 1A also shows a seventh multi-mode waveguide section 160-D and an eighth multi-mode waveguide section 170-D. The seventh multi-mode waveguide section 160-D is coupled to the first multi-mode waveguide section 160-A via a ninth multi-mode waveguide section 160-E located between lines 102-2 and 102-5, and the eighth multi-mode waveguide section 170-D is coupled to the second multi-mode waveguide section 170-A via a tenth multi-mode waveguide section 170-E between lines 102-2 and 102-6. In some embodiments, the ninth multi-mode waveguide section 160-E is curved as shown in FIG. 1A. In some embodiments, the ninth multi-mode waveguide section 160-E is straight. In some embodiments, the tenth multi-mode waveguide section 170-E is curved as shown in FIG. 1A. In some embodiments, the tenth multi-mode waveguide section 170-E is straight. In some embodiments, at least one of the ninth multi-mode waveguide section 160-E and the tenth multi-mode waveguide section 170-E has a portion that is curved.

In some embodiments, a waveguide section of waveguide sections 160-C, 170-C, 160-E, and 170-E includes two or more curved sections (e.g., any of waveguide sections 160-C, 170-C, 160-E, and 170-E can have two or more curved sections having different centers of curvature, such as curved sections forming an s-curve). In some embodiments, the specific shape of the curves is designed to ensure adiabaticity of the optical mode of light as the light travels through the curved portion (e.g., light launched into the first curve in the fundamental mode will largely remain in the fundamental mode while propagating through the curves). As one of ordinary skill in the art would appreciate, the requirement for adiabaticity ensures that the excitation of higher order modes is reduced, e.g., excitation of higher order transverse modes, back scattered modes, and/or radiative modes, is minimized as the light travels through the curved sections. Depending on the geometric constraints of the device layout, any number of different types of curves can be used including, e.g., Euler bends, Bezier curves, S-curves and the like. Furthermore, the specific geometry that satisfies the adiabaticity condition will depend on the index of refraction around the waveguide itself. Thus, the curve shape at the input portion (e.g., the curve of a portion of the waveguide section 160-C proximate to line 102-3) may be different from the curve at the output portion (e.g., the curve of a portion of the waveguide section 160-C proximate to the coupling region, just before the line 102-1). These curves may be different because the presence of the other waveguide just above or just below may affect the local refractive index near the bend and thereby change the adiabaticity condition in that region.

As shown in FIG. 1A, when light 110 is injected into the third multi-mode waveguide section 160-B of the first waveguide 150, the light 110 propagates toward the fifth multi-mode waveguide section 160-C and enters the first multi-mode waveguide section 160-A, where the light 110 is coupled to the second multi-mode waveguide section 170-A. Subsequently, the light 110 propagates within the second waveguide 152 from the second multi-mode waveguide section 170-A through the tenth multi-mode waveguide section 170-E toward the eighth multi-mode waveguide section 170-D.

Additionally or alternatively, when light 112 is injected into the fourth multi-mode waveguide section 170-B of the second waveguide 152, the light 112 propagates toward the sixth multi-mode waveguide section 170-C and enters the second multi-mode waveguide section 170-A, where the light 112 is coupled to the first multi-mode waveguide section 160-A. Subsequently, the light 112 propagates within the first waveguide 150 from the first multi-mode waveguide section 160-A through the ninth multi-mode waveguide section 160-E toward the seventh multi-mode waveguide section 160-D.

Figure 1C:
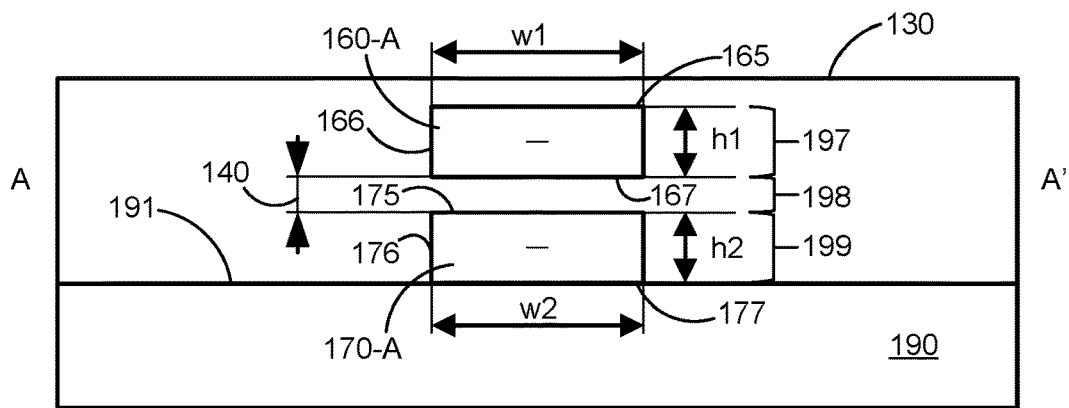
FIGS. 1C, 1F, 1G and 1H are partial cross-sectional views of the optical coupler shown in FIGS. 1A and 1B.
Figure 1D:
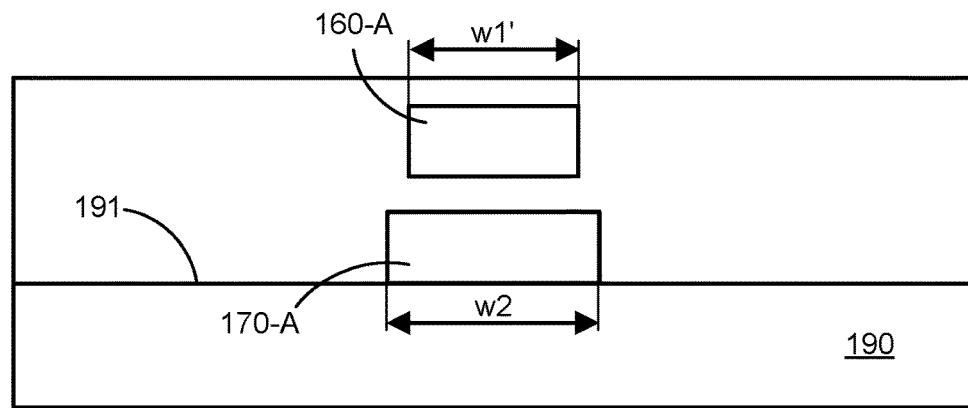
FIGS. 1D and 1E are partial cross-sectional views of optical couplers in accordance with some embodiments.
Figure 1E:
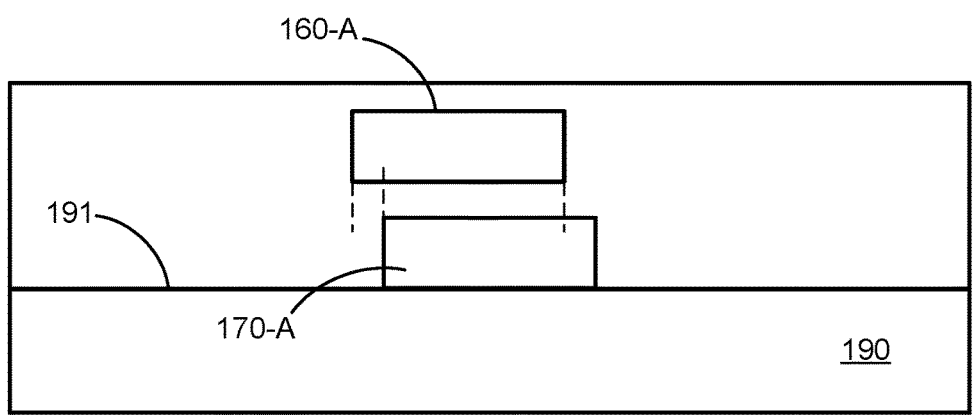
Figure 1F:
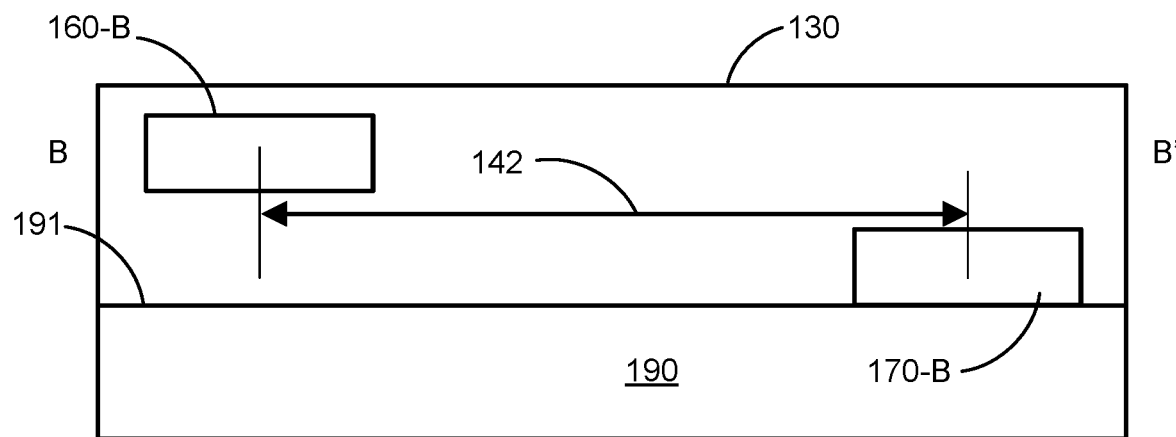
Figure 1G:
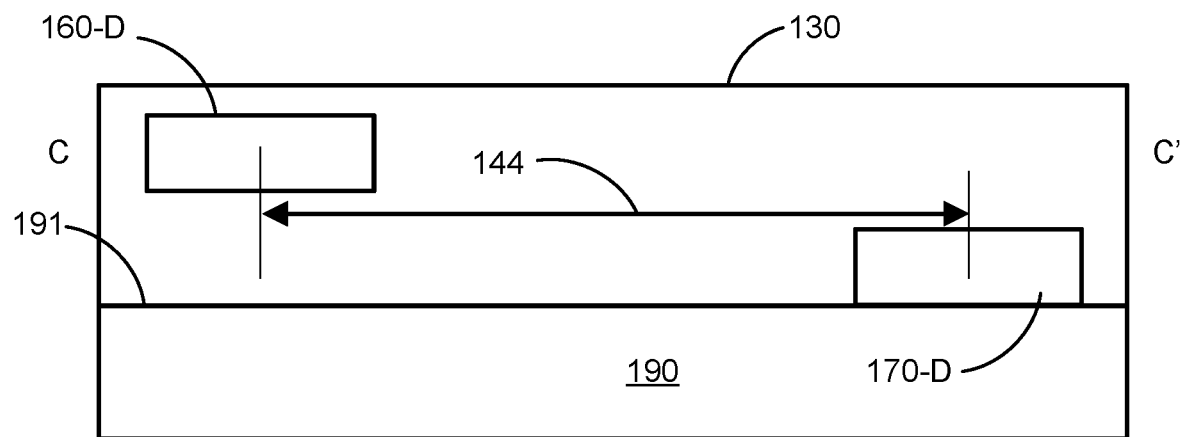
Figure 1H:
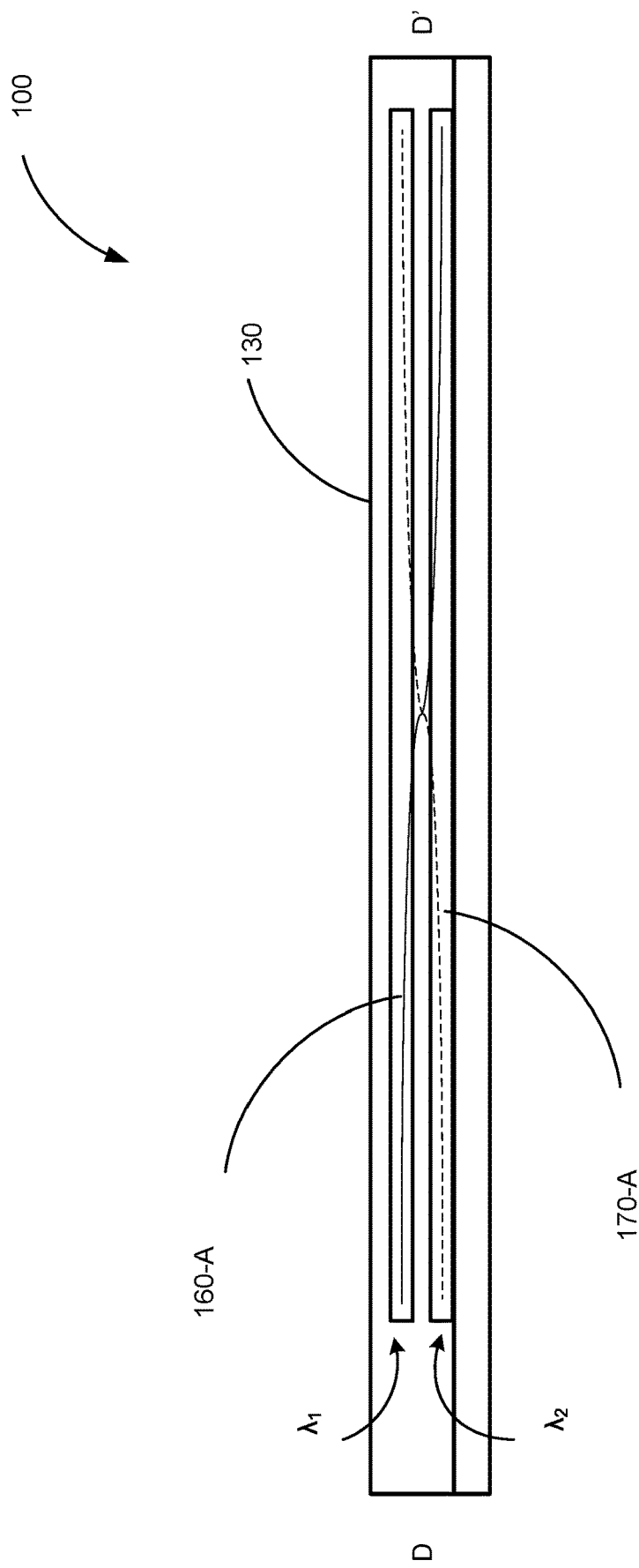

Turning to FIG. 1B, line AA' represents a view from which the cross-section shown in FIG. 1C is taken, line BB' represents a view from which the cross-section shown in FIG. 1F is taken, line CC' represents a view from which the cross-section shown in FIG. 1G is taken, and line DD' represents a view from which the cross-section shown in FIG. 1H is taken.

FIG. 1C shows that the first multi-mode waveguide section 160-A has a cross-section characterized by first height h1 (also called a first thickness) and first width w1 that is greater than the first height h1.

FIG. 1C also shows that the second multi-mode waveguide section 170-A has a cross-section characterized by second height h2 (also called a second thickness) and a second width w2 that is greater than the second height h2.

In some embodiments, the heights h1 and h2 and the widths w1 and w2 are chosen to reduce or minimize loss. For example, in some embodiments, the side walls (e.g., side walls 166 and 176) of the waveguides may be rougher than the top and bottom surfaces (e.g., top and bottom surfaces 165, 167, 175 and 177) of the waveguides. In such a case, a large width waveguide will be beneficial because for larger waveguide widths, the fraction of the fundamental mode that extends out of the waveguide is reduced. Accordingly, for larger waveguide widths, there is a lower probability of exciting higher order modes (such as radiative modes or back reflective modes) due to the interaction of the optical mode with the rough sidewalls. In such a case, if the top and bottom walls are smooth, then the thickness of the waveguide can be smaller than the width of the waveguide. On the other hand, if both the sidewalls and the top and bottom surfaces are rough, it may be beneficial to have a large width and a large thickness. Likewise, if the top and bottom surfaces are rough but the sidewalls are smooth, it may be beneficial to have a waveguide whose thickness exceeds its width.

In some embodiments (e.g., where the sidewall roughness is the dominant source of scattering and loss), a respective multi-mode waveguide section (e.g., the first multi-mode waveguide section 160-A and/or the second multi-mode waveguide section 170-A) has a width between 0.5 μm-10 μm. In some embodiments, the respective multi-mode waveguide section has a height between 20 nm-1 μm. Accordingly, in this example, the waveguide width can range from approximately 3 to 10 times the waveguide thickness. Likewise, if the roughness of the top and bottom surfaces of the waveguide are greater than the roughness of the sidewalls, then the waveguide thickness can range from approximately 3 to 10 times the thickness, which could be represented pictorially as the waveguides shown in FIG. 1C being rotated 90 degrees about an axis that extends perpendicularly out of the page.

In some embodiments, the first width w1 corresponds to the second width w2 (e.g., FIG. 1C). In some embodiments, the first width w1 is different from the second width w2 (e.g., the first width w1' in FIG. 1D is less than the second width w2). In some embodiments, the first height h1 corresponds to the second height h2 (e.g., FIG. 1C). In some embodiments, the first height h1 is different from the second height h2 (e.g., the first height h1 is less than the second height h2). For example, when the first multi-mode waveguide section 160-A and the second multi-mode waveguide section 170-A are made of different materials, the size (e.g., the height and/or the width) of at least one of the two multi-mode waveguide sections 160-A and 170-A is adjusted for impedance matching between the two multi-mode waveguide sections 160-A and 170-A.

The first multi-mode waveguide section 160-A is positioned at least partially above or below the second multi-mode waveguide section 170-A. In some cases, the entire width of the first multi-mode waveguide section 160-A is located above the second multi-mode waveguide section 170-A as shown in FIG. 1C. In some cases, the first multi-mode waveguide section 160-A is partially offset from the second multi-mode waveguide section 170-A (e.g., only a portion of the first multi-mode waveguide section 160-A is located directly above the second multi-mode waveguide section 170-A and another portion of the first multi-mode waveguide section 160-A is not located directly above the second multi-mode waveguide section 170-A as shown in FIG. 1E).

Turning back to FIG. 1C, the first multi-mode waveguide section 160-A and the second multi-mode waveguide section 170-A are configured to allow light entering the first multi-mode waveguide section 160-A to be coupled from the first multi-mode waveguide section 160-A to the second multi-mode waveguide section 170-A. In particular, the first multi-mode waveguide section 160-A and the second multi-mode waveguide section 170-A are configured to allow light entering the first multi-mode waveguide section 160-A in a fundamental mode to be coupled from the first multi-mode waveguide section 160-A to the second multi-mode waveguide section 170-A while the coupled light remains in the fundamental mode. For example, the first multi-mode waveguide section 160-A has a first distance 140 to the second multi-mode waveguide section 170-A that allows optical coupling from the first multi-mode waveguide section 160-A to the second multi-mode waveguide section 170-A. In some embodiments, the first distance 140 is between 20 nm-500 nm. For example, as shown in FIG. 1H, light entering the first multi-mode waveguide section 160-A from a section 160-E is transmitted to the second multi-mode waveguide section 170-A, for example via evanescent coupling, and light entering the second multi-mode waveguide section 170-A from a section 170-E is transmitted to the first multi-mode waveguide section 160-A, for example via evanescent coupling.

For some of the configurations in which the first multi-mode waveguide section 160-A and the second multi-mode waveguide section 170-A are not located side-by-side, a center-to-center distance between the first multi-mode waveguide section 160-A and the second multi-mode waveguide section 170-A is less than an average of the first width w1 and the second width w. In comparison, for a configuration in which the first multi-mode waveguide section and the second multi-mode waveguide section is located side-by-side, the center-to-center distance between the first multi-mode waveguide section and the second multi-mode waveguide section is greater than the average of the first width and the second width (i.e., the sum of a half-width of the first multi-mode waveguide section and a half-width of the second multi-mode waveguide section). By reducing the center-to-center distance between the first multi-mode waveguide section and the second multi-mode waveguide section, the coupling efficiency between the two multi-mode waveguide sections that are located above and below each other is increased, compared to the coupling efficiency between two multi-mode waveguide sections that are located side-by-side.

In some embodiments, the first waveguide 150 and the second waveguide 152 are located over a substrate 190. In some embodiments, the substrate 190 is a semiconductor substrate (e.g., a silicon substrate).

In some embodiments, the first waveguide 150 and the second waveguide 152 have sidewalls 166 and 176 that are substantially perpendicular with respect to a surface 191 of the substrate 190 (e.g., each of the sidewalls 166 and 176 forms an angle between 85 degrees and 95 degrees with the top surface 191 and/or the bottom surface of the substrate 190). In other embodiments, the sidewalls are not perpendicular and could be positioned at an angle relative to the top and bottom surfaces, e.g., forming a waveguide having a trapezoidal shape (e.g., a trapezoidal cross-section).

In some embodiments, the first multi-mode waveguide section 160-A is formed in a first layer 197 of material located over the substrate 190, and the second multi-mode waveguide section 170-A is formed in a second layer 199 of material located over the substrate 190 that is distinct and separate from the first layer of material.

In some embodiments, the first layer of material and the second layer of material are separated by a third layer of material that is distinct from the first layer 197 of material and the second layer 199 of material (e.g., the third layer 198 of material has a chemical composition that is different from the chemical composition of the material in the first layer and the second layer). For example, in some cases, the first layer 197 of material and the second layer 199 of material are made of silicon (e.g., the first layer 197 and the second layer 199 consist of silicon), and the third layer 198 of material is made of silicon oxide (e.g., the third layer 198 consists of silicon oxide, also known as silicon dioxide). In some embodiments, the first layer 197 and the second layer 199 can be different materials, e.g., one can be formed of Si and one from SiN.

In some embodiments, the first multi-mode waveguide section 160-A and the second multi-mode waveguide section 170-A are covered by a protective layer 130. In some embodiments, the protective layer 130 is made of the same material that constitutes the third layer 198. In some embodiments, the protective layer 130 is made of a material that is different from the material constituting the third layer 198.

Returning to FIG. 1A, the third multi-mode waveguide section 160-B has a first lateral distance 142, greater than the first distance 140, to the fourth multi-mode waveguide section 170-B. As shown in FIG. 1F, the first lateral distance 142 is a center-to-center distance between the third multi-mode waveguide section 160-B and the fourth multi-mode waveguide section 170-B on a plane that is parallel to the surface 191 of the substrate 190. In some embodiments, the first lateral distance 142 is at least 1 µm, but one of ordinary skill in the art will appreciate that this lateral distance depends on many factors including the waveguide width, curve design, index of refraction of the waveguide core and surrounding material, etc. The first lateral distance 142 between the third multi-mode waveguide section 160-B and the fourth multi-mode waveguide section 170-B is significantly greater than the first distance 140 between the first multi-mode waveguide section 160-A and the second multi-mode waveguide section 160-B. As a result, light does not couple between the third multi-mode waveguide section 160-B and the fourth multi-mode waveguide section 170-B.

Returning to FIG. 1A, the seventh multi-mode waveguide section 160-D has a second lateral distance 144, greater than the first distance 140, to the eighth multi-mode waveguide section 170-D. As shown in FIG. 1G, the second lateral distance 144 is a center-to-center distance between the seventh multi-mode waveguide section 160-D and the eighth multi-mode waveguide section 170-D on a plane that is parallel to the surface 191 of the substrate 190. In some embodiments, the second lateral distance 144 between the seventh multi-mode waveguide section 160-D and the eighth multi-mode waveguide section 170-D is identical to the first lateral distance 142 between the third multi-mode waveguide section 160-B and the fourth multi-mode waveguide section 170-B. In some embodiments, the second lateral distance 144 between the seventh multi-mode waveguide section 160-D and the eighth multi-mode waveguide section 170-D is different from the first lateral distance 142 between the third multi-mode waveguide section 160-B and the fourth multi-mode waveguide section 170-B.

In some embodiments, at least one of the ninth multi-mode waveguide section 160-E and the tenth multi-mode waveguide section 170-E has a portion that is curved to ensure adiabatic propagation of the fundamental waveguide mode as described above in reference to FIG. 1A.

FIG. 1H includes a schematic diagram illustrating the transfer of at least a portion of the first light from the first multi-mode waveguide section 160-A of the first waveguide 150 to the second multi-mode waveguide section 170-A of the second waveguide 152 (e.g., via evanescent coupling). Typically, the amount of the first light that is transferred from the first multi-mode waveguide section 160-A to the second multi-mode waveguide section 170-A is determined based on the material of the first multi-mode waveguide section 160-A, the material of the second multi-mode waveguide section 170-A, the material located between the first multi-mode waveguide section 160-A and the second multi-mode waveguide section 170-A, the distance between the first multi-mode waveguide section 160-A and the second multi-mode waveguide section 170-A, the size (e.g., the width and the height) of the first multi-mode waveguide section 160-A, the size (e.g., the width and the height) of the second multi-mode waveguide section 170-A, the length of the coupling region (e.g., a length of the first multi-mode waveguide section 160-A and/or a length of the second multi-mode waveguide section 170-A), and the wavelength of the transferred light.

In some embodiments, the entire first light is transferred from the first multi-mode waveguide section 160-A to the second multi-mode waveguide section 170-A. In some embodiments, less than all of the light is transferred from the first multi-mode waveguide section 160-A to the second multi-mode waveguide section 170-A. Advantageously, in some embodiments the minimum length of the multi-mode waveguide sections 160-A and 170-A (also referred to herein as the interaction region) to achieve maximum coupling between the waveguides for a given separation between the waveguides can be smaller than the minimum length of the interaction region for an architecture that places both multimode waveguides adjacent to each other on a single layer. This is due to the fact that in a multi-layer configuration (i.e., stacked configuration) the centroids of the optical modes can be placed closer to each other than in a side-by-side configuration, especially when the width of the multi-mode waveguides is large (as is desired to achieve low loss). As noted already in reference to FIGS. 1A-1G, in some embodiments, the length of the interaction region can be in a range of 5-200 µm, and for some designs, can be as small as 5 µm, between 5-10 µm, between 5-20 µm, between 5-30 µm, between 5-40 µm, between 5-50 µm, between 5-60 µm, between 5-70 µm, between 5-80 µm, between 5-90 µm, between 5-100 µm, between 5-110 µm, between 5-120 µm, between 5-130 µm, between 5-140 µm, between 5-150 µm, between 5-160 µm, between 5-170 µm, between 5-180 µm, between 5-190 µm, and between 5-200 µm, even assuming relatively wide multimode waveguides, e.g., having widths between 0.5 µm-10 µm and assuming a silicon on insulator photonic platform.

Figure 2:
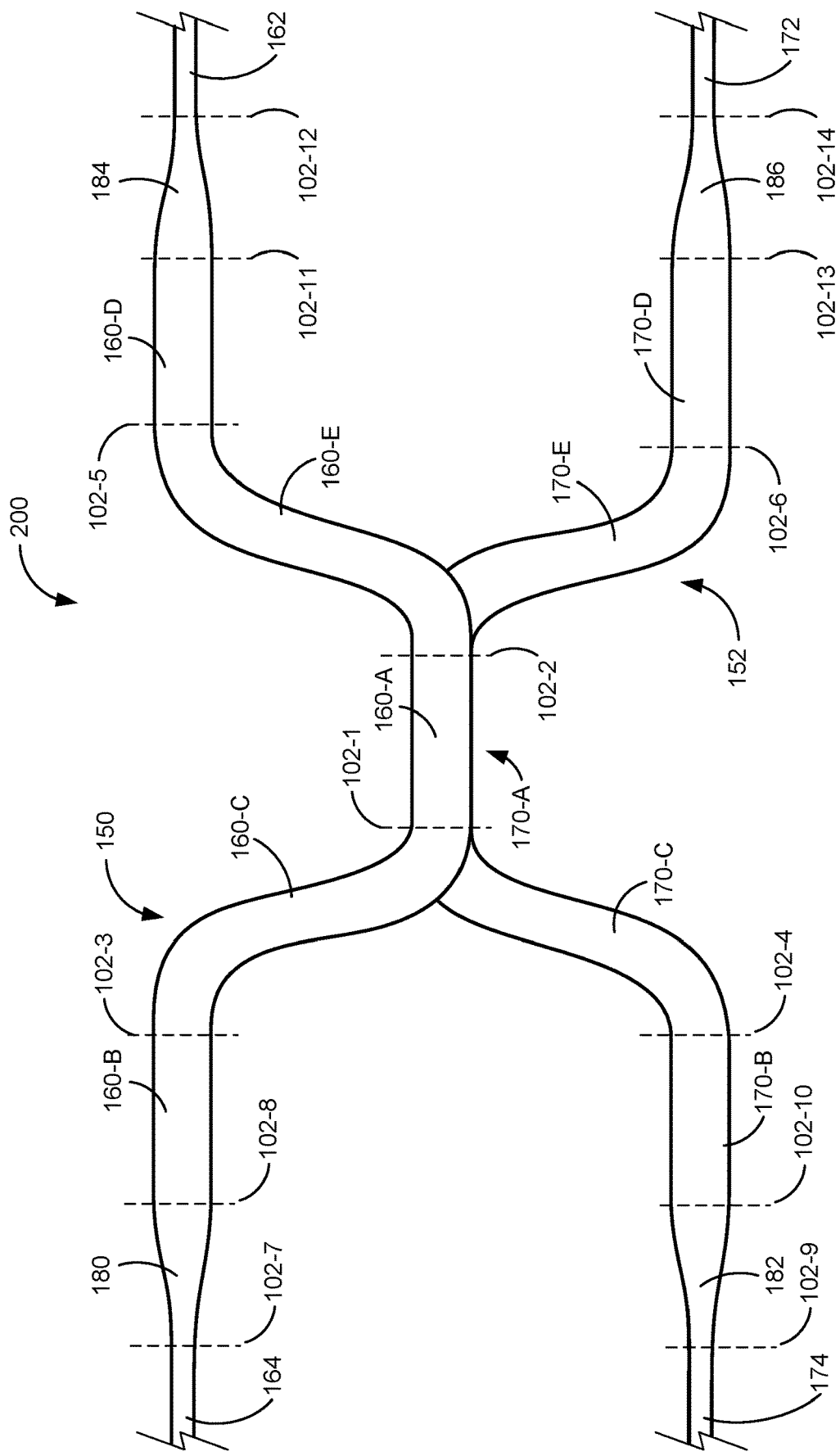
FIG. 2 is a partial plan view of an optical coupler in accordance with some embodiments.

FIG. 2 is a partial plan view of an optical coupler 200 in accordance with some embodiments. The optical coupler 200 is similar to the optical coupler 100 shown in FIGS. 1A-1H. However, in some embodiments, the optical coupler 200 differs from the optical coupler 100 at least in that that the first waveguide 150 includes a first single-mode input waveguide section 164 adiabatically coupled to the first multi-mode waveguide section 160-A and configured to provide light to the first multi-mode waveguide section 160-A (e.g., through the third multi-mode waveguide section 160-B and the fifth multi-mode waveguide section 160-C) and a second single-mode input waveguide section 174 adiabatically coupled to the second multi-mode waveguide section 170-A and configured to provide light to the second multi-mode waveguide section 170-A (e.g., through the fourth multi-mode waveguide section 170-B and the sixth multi-mode waveguide section 170-C).

In some embodiments, the optical coupler 200 also includes a first tapered waveguide section 180, in the first waveguide 150, configured to enable the adiabatic coupling of the first multi-mode waveguide section 160-A to the first single-mode input waveguide section 164 (e.g., through the fifth multi-mode waveguide section 160-C and the third multi-mode waveguide section 160-B). The optical coupler 200 also includes a second tapered waveguide section 182, in the second waveguide 152, configured to enable the adiabatic coupling of the second multi-mode waveguide section 170-A to the second single-mode input waveguide section 174 (e.g., through the sixth multi-mode waveguide section 170-C and the fourth multi-mode waveguide section 170-B). As discussed above with respect to FIG. 1A, the term adiabatic refers to an optical element (e.g., a coupler or taper or a bend) that has the property that as the fundamental mode propagates through the optical element, the excitation of higher order modes, radiative modes, back reflection modes, etc. are reduced or suppressed, thereby reducing optical loss.

In some embodiments, the width of each tapered section gradually and continuously varies form a first width (e.g., a width of the third multi-mode waveguide section 160-B) to a second width (e.g., a width of the first single-mode waveguide section 162). For example, the total length of the transition region could be between 10 µm-500 µm.

In some embodiments, the optical coupler 200 includes, in the first waveguide 150, a first single-mode output waveguide section 162 adiabatically coupled to the first multi-mode waveguide section 160-A (e.g., through the seventh multi-mode waveguide section 160-D and the ninth multi-mode waveguide section 160-E) so that the first multi-mode waveguide section 160-A is configured to provide light to the first single-mode output waveguide section 162. The optical coupler 200 also includes a third tapered waveguide section 184 configured to enable the adiabatic coupling of the first single-mode output waveguide section 162 to the first multi-mode waveguide section 160-A (e.g., through the seventh multi-mode waveguide section 160-D and the ninth multi-mode waveguide section 160-E).

In some embodiments, the optical coupler 200 includes, in the second waveguide 152, a second single-mode output waveguide section 172 adiabatically coupled to the second multi-mode waveguide section 170-A (e.g., through the eighth multi-mode waveguide section 170-D and the tenth multi-mode waveguide section 170-E) so that the second multi-mode waveguide section 170-A is configured to provide light to the second single-mode output waveguide section 172. The optical coupler 200 also includes a fourth tapered waveguide section 186 configured to enable the adiabatic coupling of the second single-mode output waveguide section 172 to the second multi-mode waveguide section 170-A (e.g., through the eighth multi-mode waveguide section 170-D and the tenth multi-mode waveguide section 170-E).

In some embodiments, the first single-mode input waveguide section 164 is configured to change a direction of light before the light is adiabatically coupled to the first multi-mode waveguide section 160-A (e.g., the first single-mode input waveguide section is curved). In some embodiments, the second single-mode input waveguide section 174 is configured to change a direction of light before the light is adiabatically coupled to the second multi-mode waveguide section 170-A (e.g., the second single-mode input waveguide section is curved).

In some embodiments, the first single-mode output waveguide section 162 is configured to change a direction of light after the light is adiabatically coupled from the first multi-mode waveguide section 160-A (e.g., the first single-mode output waveguide section is curved). In some embodiments, the second single-mode output waveguide section 172 is configured to change a direction of light after the light is adiabatically coupled form the second multi-mode waveguide section 170-A (e.g., the second single-mode output waveguide section is curved).

In some embodiments, a respective single-mode waveguide section (e.g., the first single-mode input waveguide section 164, the second single-mode input waveguide section 174, the first single-mode output waveguide section 162, and the second single-mode output waveguide section 172) has a width between 150 nm and 600 nm. In some embodiments, a respective single-mode waveguide section has a height between 100 nm and 300 nm. In some cases, the respective single-mode waveguide section has a width of 400 nm and a height of 200 nm. One of ordinary skill will appreciate that the above numbers apply to devices fabricated by a silicon on insulator (SOI) photonic process and that many other widths and heights are possible depending on the choice of material and/or fabrication process.

Figure 3:
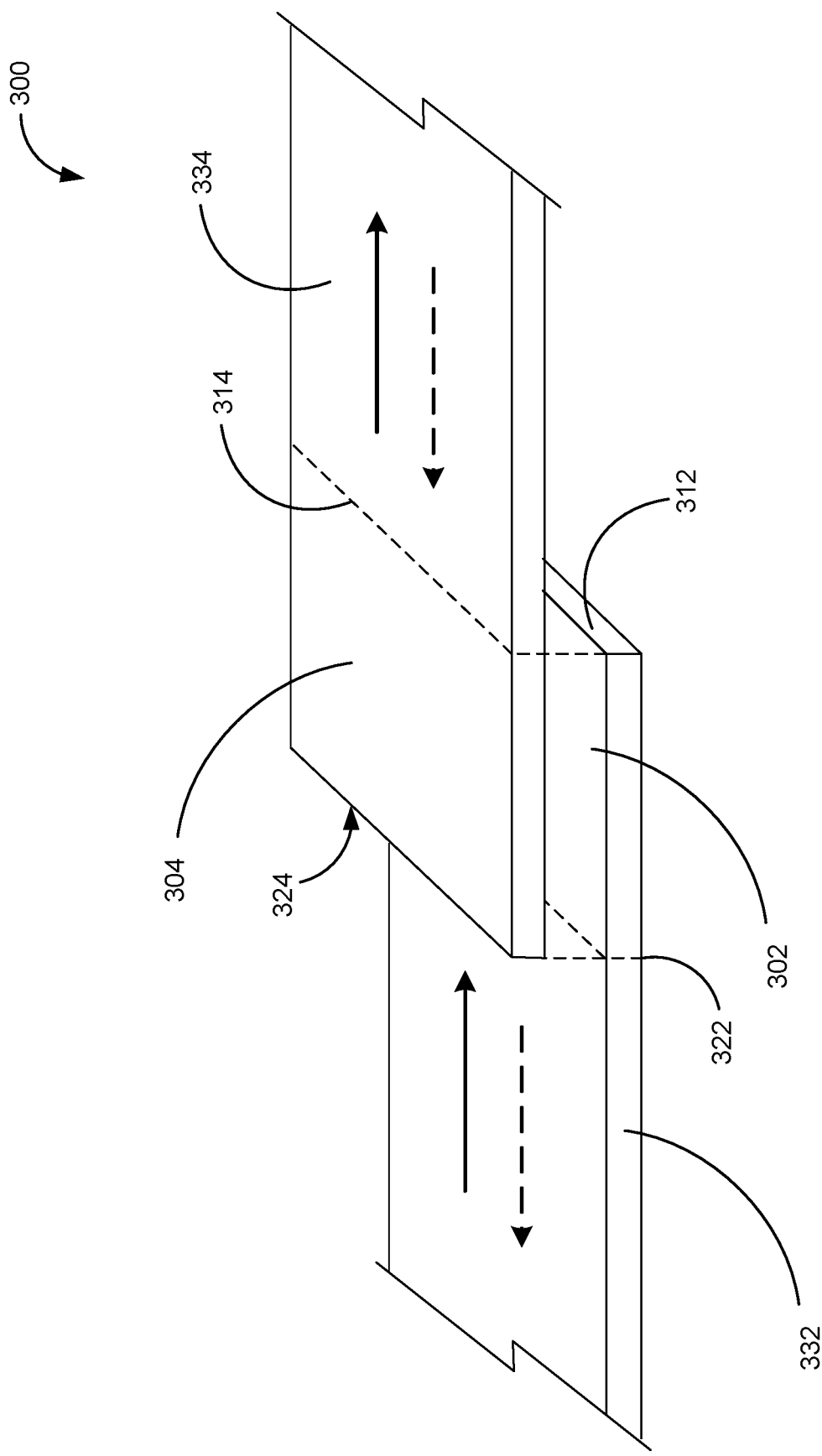
FIG. 3 is a perspective view of an optical coupler in accordance with some embodiments.

FIG. 3 is a perspective view of an optical coupler 300 in accordance with some embodiments.

The optical coupler 300 includes a first multi-mode waveguide section 302 that has a cross-section characterized by a first height and a first width that is greater than the first height (e.g., the first multi-mode waveguide section 302 is wider than its height).

The optical coupler 300 also includes a second waveguide section 304 that is distinct and separate from the first waveguide section 302. The second waveguide 304 has a cross-section characterized by a second height and a second width that is greater than the second height (e.g., the second multi-mode waveguide section 304 is wider than its height).

The first multi-mode waveguide section 302 is positioned adjacent to the second multi-mode waveguide section 304 at least partially above or below the second multi-mode waveguide 304 and has a first distance to the second multi-mode waveguide section 304 so that light entering the first multi-mode waveguide section 302 is coupled from the first multi-mode waveguide section 302 to the second multi-mode waveguide section 304 and/or light entering the second multi-mode waveguide section 304 is coupled from the second multi-mode waveguide section 304 to the first multi-mode waveguide section 302.

The optical coupler 300 is similar to the optical coupler 100 shown in FIGS. 1A-1H, except that a first end 312 of the first multi-mode waveguide section 302 is not connected to another waveguide section (as a result, a portion of light transmitted through the first waveguide but not coupled to the second waveguide ceases to propagate along the first waveguide at the first end 312 of the first multi-mode waveguide section 302) while a first end 314 of the second multi-mode waveguide section 304 is connected to another waveguide section 334 (as a result, the light transferred from the first multi-mode waveguide section 302 to the second multi-mode waveguide section 304 continues to propagate through the second waveguide). In addition, a second end 322 of the first multi-mode waveguide section 302, opposite to the first end 312 of the multi-mode waveguide section 302, is connected to another waveguide section 332 (e.g., as a result, the first multi-mode waveguide section 302 receives light from the waveguide section 332 prior to transferring the light to the second multi-mode waveguide section 304 through optical coupling) while a second end 324 of the second multi-mode waveguide section 304, opposite to the first end 314 of the second multi-mode waveguide section 304, is not connected to another waveguide section (as a result, the second waveguide receives light primarily from the first waveguide through the optical coupling).

Figure 4:
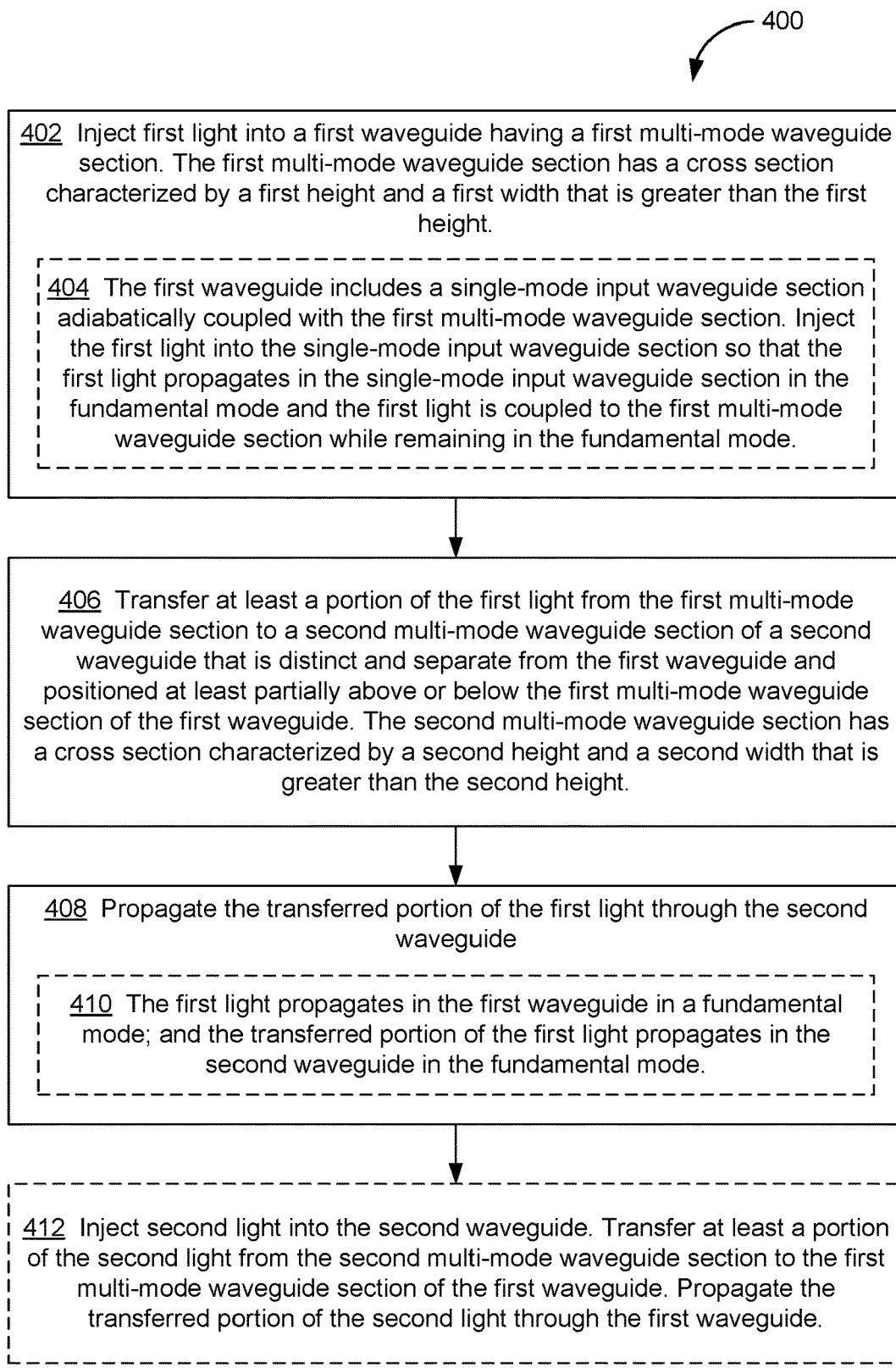
FIG. 4 is a flowchart illustrating a method of transmitting light through an optical coupler in accordance with some embodiments.

FIG. 4 is a flowchart illustrating a method 400 of transmitting light between waveguides in accordance with some embodiments.

The method 400 includes (402) injecting first light into a first waveguide 150 having a first multi-mode waveguide section 160-A (e.g., injecting light having a wavelength λ into the seventh multi-mode waveguide section 160-D of the first waveguide 150 as shown in FIG. 1B). The first multi-mode waveguide section 160-A has a cross-section characterized by first height h1 and first width w1 that is greater than the first height h1 (FIG. 1C).

In some embodiments, the first waveguide includes (404) a single-mode input waveguide section adiabatically coupled with the first multi-mode waveguide section (e.g., the single-mode input waveguide section 164 in FIG. 2). The method includes injecting the first light into the single-mode input waveguide section so that the first light propagates in the single-mode input waveguide section in the fundamental mode and the first light is coupled to the first multi-mode waveguide section while remaining in the fundamental mode.

The method 400 also includes (406) transferring at least a portion of the first light from the first multi-mode waveguide section 160-A to a second multi-mode waveguide section 170-A of a second waveguide 152 that is distinct and separate from the first waveguide 150 and positioned at least partially above or below the first multi-mode waveguide section 160-A of the first waveguide 150 (e.g., FIGS. 1B and 1E). The second multi-mode waveguide section 170-A has a cross-section characterized by second height h2 and a second width 192 that is greater than the second height h2 (FIG. 1C).

The method 400 further includes (408) propagating the transferred portion of the first light through the second waveguide 152 (e.g., the light having the wavelength λ propagates through the fourth multi-mode waveguide section 170-B of the second waveguide 152 as shown in FIG. 1B).

In some embodiments, the first light propagates (410) in the first waveguide in a fundamental mode; and the transferred portion of the first light propagates in the second waveguide in the fundamental mode. Due to the shape of the first multi-mode waveguide section, the first light propagating in the fundamental mode within the first multi-mode waveguide section has a reduced interaction with the side walls of the first multi-mode waveguide section, which, in turn, reduces the loss of the first light while the first light propagates within the first multi-mode waveguide section. Similarly, due to the shape of the second multi-mode waveguide section, the transmitted portion of the first light propagating in the fundamental mode within the second multi-mode waveguide section has a reduced interaction with the side walls of the second multi-mode waveguide section, which, in turn, reduces the loss of the transmitted portion of the first light while the transmitted portion of the first light propagates within the second multi-mode waveguide section.

In some embodiments, the method includes (412) injecting second light into the second waveguide (e.g., injecting light having a wavelength 22 into the eighth multi-mode waveguide section 170-D of the second waveguide 152 as shown in FIG. 1B); transferring at least a portion of the second light from the second multi-mode waveguide section 170-A to the first multi-mode waveguide section 160-A of the first waveguide 150; and propagating the transferred portion of the second light through the first waveguide 150 (e.g., the light having the wavelength 22 propagates through the third multi-mode waveguide section 160-B of the first waveguide 150 as shown in FIG. 1B).

In some embodiments, the first light and the second light are infrared light. In some embodiments, the first light and the second light have a center wavelength between 300 nm and 3000 nm (e.g., between 1400 nm and 1700 nm) depending on the choice of material. In some embodiments, the first light has a first center wavelength and the second light has a second center wavelength distinct from the first center wavelength.

In some embodiments, the first waveguide and the second waveguide have one or more features described with respect to FIGS. 1A-1H and 2-3. For example, at least one of the first waveguide and the second waveguide includes a curved multi-mode waveguide section. For brevity, such details are not repeated herein.

Figure 5A:
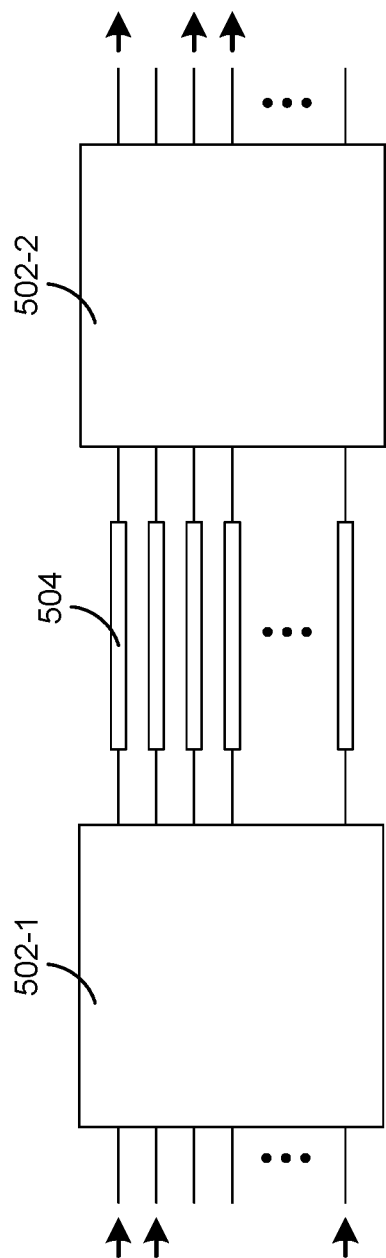
FIG. 5A is a schematic diagram illustrating a generalized Mach-Zehnder interferometer in accordance with some embodiments.

FIG. 5A is a schematic diagram illustrating a generalized Mach-Zehnder interferometer in accordance with some embodiments. The generalized Mach-Zehnder interferometer includes multi-channel optical couplers 502-1 and 502-2 coupled with multiple waveguides. As described with respect to FIG. 5B, at least one of the multi-channel optical couplers 502-1 and 502-2 includes a multi-mode optical coupler described above.

The generalized Mach-Zehnder interferometer also includes a plurality of phase shifters 504 coupled with at least a subset of the multiple waveguides between the multi-channel optical couplers 502-1 and 502-2. A phase shifter is configured to change a phase of light propagating through an associated waveguide. For example, a phase shifter changes a temperature of a material forming the waveguide, which, in turn, changes a refractive index of the material and the phase of light propagating within the waveguide. Alternatively, or in addition, the phase shifter changes the refractive index of the material by applying an electric field.

The generalized Mach-Zehnder interferometer is sometimes used as an optical switch or a power splitter. For example, a generalized Mach-Zehnder interferometer can be used to receive light from one or more input waveguides and relay the light to one or more (typically a plurality of) output waveguides. For example, inducing phase shifts in one or more waveguides using the phase shifters 504 changes the distribution of light in the output waveguides.

Figure 5B:
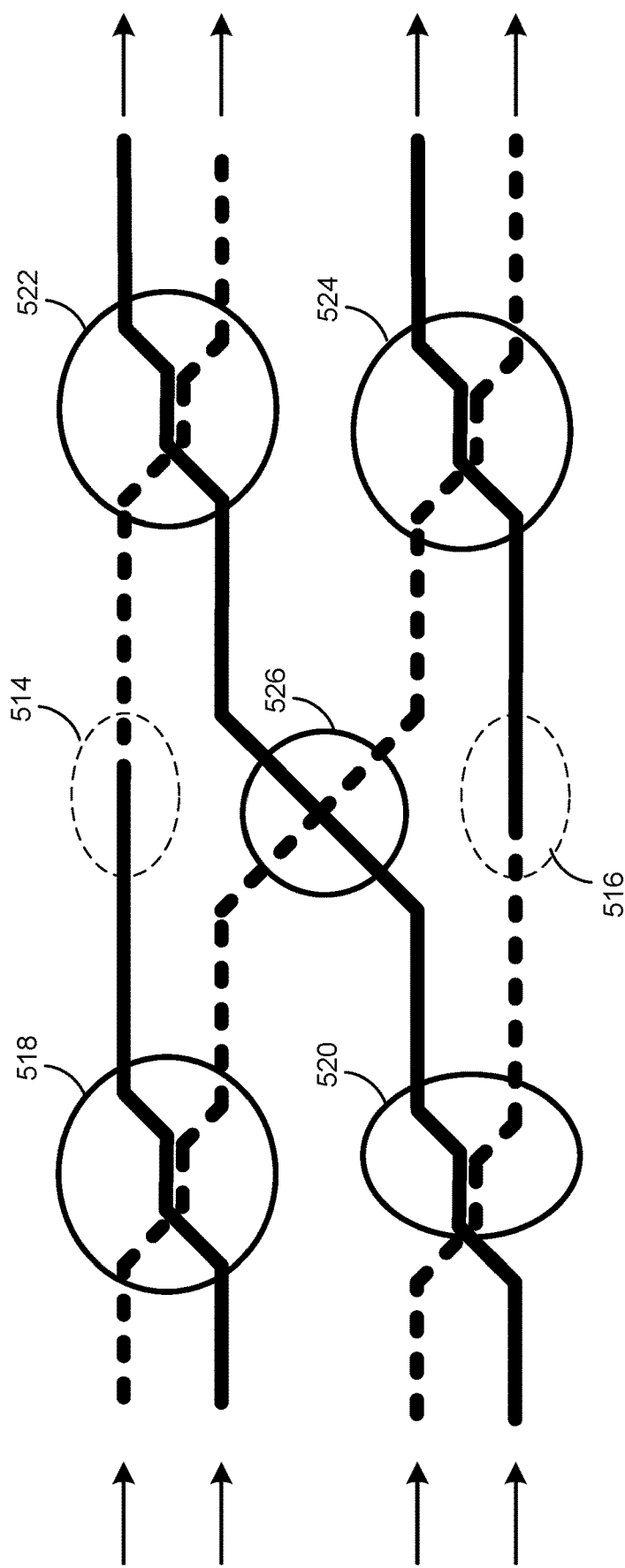
FIG. 5B illustrates an example optical device, which corresponds to a multi-channel optical coupler shown in FIG. 5A.

FIG. 5B illustrates an example optical device, which corresponds to the multi-channel optical coupler 502-1 or 502-2 shown in FIG. 5A.

The optical device includes a first plurality of optical waveguides formed in a first layer of material (e.g., waveguides represented by solid lines in FIG. 5B) and a second plurality of optical waveguides formed in a second layer of material that is distinct and separate from the first layer of material (e.g., waveguides represented by dashed lines in FIG. 5B). The second layer of material and the first layer of material are located at different heights on a substrate.

At least one optical waveguide of the first plurality of optical waveguides is coupled with an optical waveguide of the second plurality of optical waveguides with any multi-mode optical coupler described herein (e.g., the optical coupler 100 shown in FIGS. 1A-1G, the optical coupler 150 shown in FIG. 2, etc.). For example, the optical device shown in FIG. 5B includes four optical couplers 518, 520, 522, and 524, each of which can have the structure of the optical coupler 100 shown in FIGS. 1A-1G or an analogous twisted configuration in which the two waveguides cross each other as shown in FIG. 5B. Similar to the optical coupler 100 shown in FIGS. 1A-1G, each optical coupler has a coupling region in which two waveguides propagate in parallel. Although the two waveguides are illustrated in FIG. 5B as being offset from each other in the coupling region, the two waveguides may be positioned directly above and below each other in the coupling region without offset as shown in FIG. 1A. In some embodiments, one or more of the optical couplers 518, 520, 522, and 524 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 5B can include two inter-layer optical couplers 514 and 516, each of which has the structure of the inter-layer optical coupler 300 shown in FIG. 3. The optical coupler 514 allows transfer of light propagating in a waveguide on the first layer of material to a waveguide on the second layer of material, and the optical coupler 516 allows transfer of light propagating in a waveguide on the second layer of material to a waveguide on the first layer of material. Alternatively, the optical coupler 100 shown in FIG. 1, configured for 100% coupling efficiency, may be used as the optical coupler 514 or the optical coupler 516.

Furthermore, the optical device shown in FIG. 5B includes a non-coupling waveguide crossing region 526. In some implementations, the two waveguides cross each other without having a parallel coupling region present at the crossing in the non-coupling waveguide crossing region 526 (e.g., the waveguides can be two straight waveguides that cross each other at a nearly 90-degree angle).

The optical couplers 514 and 516 allows optical waveguides located in at least two different layers to be used in the multi-channel optical coupler 502-1 or 502-2, which, in turn, enables a compact multi-channel optical coupler. In addition, the use of multi-mode waveguides as described above in reference to FIGS. 1-2 provides for a lower loss multi-channel optical coupler as compared to implementations that rely on single mode waveguides only.

Although some of the drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical coupler, comprising:
   a first waveguide including a first multi-mode waveguide section; and
   a second waveguide that is distinct and separate from the first waveguide, the second waveguide including a second multi-mode waveguide section that is distinct and separate from the first multi-mode waveguide section, wherein:

the first multi-mode waveguide section has a cross-section characterized by a first height and a first width that is greater than the first height;
the second multi-mode waveguide section has a cross-section characterized by a second height and a second width that is greater than the second height;
the first multi-mode waveguide section is positioned adjacent to the second multi-mode waveguide section at least partially above or below the second multi-mode waveguide section so that light entering the first multi-mode waveguide section is coupled from the first multi-mode waveguide section to the second multi-mode waveguide section; and
the first multi-mode waveguide section and the second multi-mode waveguide section are separated by a first edge-to-edge distance so that light entering the first multi-mode waveguide section in a fundamental mode is coupled from the first multi-mode waveguide section to the second multi-mode waveguide section while remaining in the fundamental mode.

2. The optical coupler of claim 1, wherein:
the first width is at least three times the first height; and
the second width is at least three times the second height.

3. The optical coupler of claim 1, wherein:
the first waveguide includes a third multi-mode waveguide section that is distinct from, and mutually exclusive to, the first multi-mode waveguide section so that light propagating in the third multi-mode waveguide section propagates toward the first multi-mode waveguide section; and
the second waveguide includes a fourth multi-mode waveguide section that is distinct from, and mutually exclusive to, the second multi-mode waveguide section so that light propagating in the fourth multi-mode waveguide section propagates toward the second multi-mode waveguide section.

4. The optical coupler of claim 3, wherein:
the first waveguide includes a fifth multi-mode waveguide section that is coupled to the first multi-mode waveguide section on a first end and to the third multi-mode waveguide section on a second end that is opposite to the first end; and
the second waveguide includes a sixth multi-mode waveguide section that is coupled to the second multi-mode waveguide section on a first end and to the fourth multi-mode waveguide section on a second end that is opposite to the first end,
wherein at least one of the fifth multi-mode waveguide section and the sixth multi-mode waveguide section is curved.

5. The optical coupler of claim 4, wherein:
the first waveguide includes a seventh multi-mode waveguide section that is distinct from, and mutually exclusive to, the first multi-mode waveguide section so that light propagating in the first multi-mode waveguide section propagates toward the seventh multi-mode waveguide section; and
the second waveguide includes an eighth multi-mode waveguide section that is distinct from, and mutually exclusive to, the second multi-mode waveguide section so that light propagating in the second multi-mode waveguide section propagates toward the eighth multi-mode waveguide section.

6. The optical coupler of claim 5, wherein:
the first waveguide includes a ninth multi-mode waveguide section that is coupled to the first multi-mode waveguide section on a first end and to the seventh multi-mode waveguide section on a second end that is opposite to the first end; and
the second waveguide includes a tenth multi-mode waveguide section that is coupled to the second multi-mode waveguide section on a first end and to the eighth multi-mode waveguide section on a second end that is opposite to the first end,
wherein at least one of the ninth multi-mode waveguide section and the tenth multi-mode waveguide section is curved.

7. The optical coupler of claim 1, wherein:
the first waveguide includes a first single-mode input waveguide section adiabatically coupled to the first multi-mode waveguide section so that the first multi-mode waveguide section receives light from the first single-mode input waveguide section; and
the second waveguide includes a second single-mode input waveguide section adiabatically coupled to the second multi-mode waveguide section so that the second multi-mode waveguide section receives light from the second single-mode input waveguide section.

8. The optical coupler of claim 7, further comprising:
a first tapered waveguide section, in the first waveguide, configured to enable the adiabatic coupling of the first single-mode input waveguide section to the first multi-mode waveguide section; and
a second tapered waveguide section, in the second waveguide, configured to enable the adiabatic coupling of the second single-mode input waveguide section to the second multi-mode waveguide section.

9. The optical coupler of claim 8, further comprising:
in the first waveguide:
 a first single-mode output waveguide section adiabatically coupled to the first multi-mode waveguide section so that the first single-mode output waveguide section receives light from the first multi-mode waveguide section; and
 a third tapered waveguide section configured to enable the adiabatic coupling of the first multi-mode waveguide section to the first single-mode output waveguide section; and
in the second waveguide:
 a second single-mode output waveguide section adiabatically coupled to the second multi-mode waveguide section so that the second single-mode output waveguide section receives light from the second multi-mode waveguide section; and
 a fourth tapered waveguide section configured to enable the adiabatic coupling of the second multi-mode waveguide section to the second single-mode output waveguide section.

10. The optical coupler of claim 1, wherein the first multi-mode waveguide section and the second multi-mode waveguide section are parallel to each other.

11. A multi-channel multi-mode optical coupler, comprising:
two or more multi-mode optical couplers, including a first multi-mode optical coupler that corresponds to the optical coupler of claim 1, wherein:
 the first waveguide is located in a first layer of material;
 the second waveguide is located in a second layer of material that is distinct and separate from the first layer of material; and
 the first multi-mode waveguide section is positioned adjacent to the second multi-mode waveguide section.

12. The multi-channel multi-mode optical coupler of claim 11, wherein:
the two or more multi-mode optical couplers also include a second multi-mode optical coupler that includes:
a third waveguide including a third multi-mode waveguide section, the third waveguide being located in the first layer of material; and
a fourth waveguide that is distinct and separate from the third waveguide, the fourth waveguide including a fourth multi-mode waveguide section and being located in the second layer of material;
the third multi-mode waveguide section is positioned adjacent to the fourth multi-mode waveguide section; and
a portion of the second waveguide is positioned adjacent to a portion of the third waveguide for coupling light from the second waveguide to the third waveguide.

13. The multi-channel multi-mode optical coupler of claim 12, wherein:
the two or more multi-mode optical couplers also include a third multi-mode optical coupler and a fourth multi-mode optical coupler;
the third multi-mode optical coupler includes:
a fifth waveguide including a fifth multi-mode waveguide section, the fifth waveguide being located in the first layer of material; and
the fourth waveguide that is distinct and separate from the fifth waveguide, the fourth waveguide including a sixth multi-mode waveguide section that is different from the fourth multi-mode waveguide section;
the fifth multi-mode waveguide section is positioned adjacent to the sixth multi-mode waveguide section;
the fourth multi-mode optical coupler includes:
the first waveguide including a seventh multi-mode waveguide section that is different from the first multi-mode waveguide section; and
a sixth waveguide including an eighth multi-mode waveguide section, the sixth waveguide being located in the second layer of material;
the seventh multi-mode waveguide section is positioned adjacent to the eighth multi-mode waveguide section; and
a portion of the fifth waveguide is positioned adjacent to a portion of the sixth waveguide for coupling light from the fifth waveguide to the sixth waveguide.

14. A generalized Mach-Zehnder interferometer, comprising:
a first multi-channel optical coupler that includes four or more output ports;
a second multi-channel optical coupler that includes four or more input ports;
four or more optical waveguides, a respective optical waveguide of the four or more optical waveguides being connected to a respective output port of the four or more output ports and a respective input port of the four or more input ports; and
one or more phase shifters coupled with at least a subset of the four or more optical waveguides,
wherein one of the first multi-channel optical coupler and the second multi-channel optical coupler corresponds to the multi-channel multi-mode optical coupler of claim 13.

15. A generalized Mach-Zehnder interferometer, comprising:
a first multi-channel optical coupler that includes four or more output ports;
a second multi-channel optical coupler that includes four or more input ports;
four or more optical waveguides, a respective optical waveguide of the four or more optical waveguides being connected to a respective output port of the four or more output ports and a respective input port of the four or more input ports; and
one or more phase shifters coupled with at least a subset of the four or more optical waveguides,
wherein: both the first multi-channel optical coupler and the second multi-channel optical coupler correspond to the multi-channel multi-mode optical coupler of claim 13.

16. A method, comprising:
injecting first light into a first waveguide having a first multi-mode waveguide section, the first multi-mode waveguide section having a cross-section that is characterized by a first height and a first width that is greater than the first height such that the first light propagates in the first multi-mode waveguide section of the first waveguide in a fundamental mode;
transferring at least a portion of the first light from the first multi-mode waveguide section to a second multi-mode waveguide section of a second waveguide that is distinct and separate from the first waveguide, wherein:
the second multi-mode waveguide section has a cross-section characterized by a second height and a second width that is greater than the second height such that the transferred portion of the first light propagates in the second multi-mode waveguide section of the second waveguide in the fundamental mode;
the second multi-mode waveguide section of the second waveguide is positioned at least partially above or below the first multi-mode waveguide section of the first waveguide; and
the first multi-mode waveguide section and the second multi-mode waveguide section are separated by a first edge-to-edge distance; and
propagating the transferred portion of the first light.

17. The method of claim 16, wherein:
the first waveguide includes a single-mode input waveguide section adiabatically coupled with the first multi-mode waveguide section; and
the method includes injecting the first light into the single-mode input waveguide section so that the first light propagates in the single-mode input waveguide section in the fundamental mode and the first light is coupled to the first multi-mode waveguide section while remaining in the fundamental mode.

18. The method of claim 17, further comprising:
injecting second light into the second waveguide;
transferring at least a portion of the second light from the second multi-mode waveguide section to the first multi-mode waveguide section of the first waveguide; and
propagating the transferred portion of the second light through the first waveguide.

* * * * *